(12) United States Patent
Lee et al.

(10) Patent No.: US 12,398,263 B2
(45) Date of Patent: Aug. 26, 2025

(54) GRAFT COPOLYMER AND METHOD FOR PREPARING SAME

(71) Applicant: LG CHEM, LTD., Seoul (KR)

(72) Inventors: Gyu Il Lee, Daejeon (KR); Byeong Joon Jeong, Daejeon (KR); Woo Seon Choi, Daejeon (KR); Young Hyun Choi, Daejeon (KR); Eung Seob Yeom, Daejeon (KR)

(73) Assignee: LG CHEM, LTD., Seoul (KR)

( * ) Notice: Subject to any disclaimer, the term of this patent is extended or adjusted under 35 U.S.C. 154(b) by 830 days.

(21) Appl. No.: 17/618,790

(22) PCT Filed: Nov. 23, 2020

(86) PCT No.: PCT/KR2020/016585
§ 371 (c)(1),
(2) Date: Dec. 13, 2021

(87) PCT Pub. No.: WO2021/107533
PCT Pub. Date: Jun. 3, 2021

(65) Prior Publication Data
US 2022/0235218 A1 Jul. 28, 2022

(30) Foreign Application Priority Data
Nov. 25, 2019 (KR) .................. 10-2019-0152004

(51) Int. Cl.
| | |
|---|---|
| *C08L 55/02* | (2006.01) |
| *B29C 48/00* | (2019.01) |
| *C08F 265/04* | (2006.01) |
| *C08F 279/04* | (2006.01) |
| *C08J 3/12* | (2006.01) |

(52) U.S. Cl.
CPC ............ *C08L 55/02* (2013.01); *B29C 48/022* (2019.02); *C08F 265/04* (2013.01); *C08F 279/04* (2013.01); *C08J 3/12* (2013.01); *C08L 2203/30* (2013.01)

(58) Field of Classification Search
CPC ....... B29B 11/10; B29C 48/022; B29C 48/04; B29C 48/765; B29K 2055/02; C08F 212/08; C08F 220/44; C08F 265/04; C08F 279/04; C08J 3/12; C08L 55/02; C08L 51/003; C08L 51/006; C08L 51/04; C08L 51/06
See application file for complete search history.

(56) References Cited

U.S. PATENT DOCUMENTS

| | | | |
|---|---|---|---|
| 6,165,399 A | 12/2000 | Guntherberg et al. | |
| 6,220,745 B1 | 4/2001 | Kobayashi et al. | |
| 7,947,777 B2 | 5/2011 | Haubennestel et al. | |
| 2005/0203247 A1 | 9/2005 | Ahn | |
| 2007/0021557 A1 | 1/2007 | Lee | |
| 2009/0118393 A1 | 5/2009 | Yoo | |
| 2016/0053040 A1 | 2/2016 | Fujikawa et al. | |
| 2017/0260303 A1 | 9/2017 | Chung et al. | |
| 2018/0355160 A1 | 12/2018 | Michels et al. | |
| 2021/0292538 A1 | 9/2021 | Lee et al. | |

FOREIGN PATENT DOCUMENTS

| | | | |
|---|---|---|---|
| CN | 1238791 A | | 12/1999 |
| CN | 1902233 A | | 1/2007 |
| CN | 103158208 A | * | 6/2013 |
| CN | 104004288 A | | 8/2014 |
| GB | 1394763 A | | 5/1975 |
| JP | H7-278239 A | | 10/1995 |
| JP | H11-71437 A | | 3/1999 |
| JP | H11-80495 A | | 3/1999 |
| JP | H11188769 A | | 7/1999 |
| JP | H11-286554 A | | 10/1999 |
| JP | 2000-86730 A | | 3/2000 |
| JP | 2002-003523 A | | 1/2002 |
| JP | 2006-526051 A | | 11/2006 |
| JP | 2007-517105 A | | 6/2007 |
| JP | 3934754 B2 | * | 6/2007 |
| JP | 2014201679 A | | 10/2014 |
| JP | 2016-43528 A | | 4/2016 |
| JP | 2020-29545 A | | 2/2020 |
| KR | 100229118 B1 | | 11/1999 |
| KR | 100338968 B1 | | 5/2002 |
| KR | 20050069908 A | | 7/2005 |
| KR | 100541055 B1 | | 1/2006 |
| KR | 10-0568410 B1 | | 4/2006 |
| KR | 10-2007-0035772 A | | 4/2007 |
| KR | 20140019101 A | | 2/2014 |
| KR | 101542834 B1 | | 8/2015 |
| KR | 20160071250 A | | 6/2016 |
| KR | 20180090845 A | | 8/2018 |
| KR | 20190059037 A | | 5/2019 |
| WO | 2005/063826 A1 | | 7/2005 |

OTHER PUBLICATIONS

JP-3934754-B2 (Jun. 20, 2007) machine translation.*
CN-103158208-A (Jun. 19, 2013) machine translaiton.*
The Extended European Search Report for European Patent Application No. 20892158.5, dated Dec. 15, 2022.
"Luran S 778T Acrylonitrile Styrene Acrylate (ASA)," Ineos Styrolution, Jan. 17, 2016 (Jan. 17, 2016), pp. 1-3, XP093005355.
"Terluran GP-35 Acrylonitrile Butadiene Styrene (ABS)," Ineos Styrolution, May 30, 2016 (May 30, 2016), pp. 1-3, XP055801110.
Office Action for European Patent Application No. 20 892 158.5, dated Dec. 9, 2024.
Jurgen Maul et al, "Polystyrene and Styrene Copolymers," Ullmann's Encyclopedia of Industrial Chemistry, 2007, pp. 475-522, vol. 29.

* cited by examiner

*Primary Examiner* — Ana L. Woodward

(57) ABSTRACT

The present invention relates to a graft copolymer and a method for preparing the same, wherein the graft copolymer has merits of a superior storage convenience compared to existing dry powder and a high whiteness index, and thus may be widely applied to various fields.

4 Claims, 2 Drawing Sheets

| Material | DP (80°C, 60Φ Cylinder) | | | |
|---|---|---|---|---|
| Consolidation stress | 2.5kg (0.09kgf/cm² ≈ 8.6kPa) | | 4.5kg (0.16kgf/cm² ≈ 15.7kPa) | |
| Storage time | 6days |   | |   |
| | 9days |   | |   |
| | 12days |   | |   |
| | 15days |   | |   |
| Material | DPE (80°C, 60Φ Cylinder) | | | |
| Consolidation stress | 2.5kg (0.09kgf/cm² ≈ 8.6kPa) | | 4.5kg (0.16kgf/cm² ≈ 15.7kPa) | |
| Storage time | 15days | | | |

US 12,398,263 B2

GRAFT COPOLYMER AND METHOD FOR PREPARING SAME

CROSS-REFERENCE TO RELATED APPLICATIONS

This application is a National Phase of International Application No. PCT/KR2020/016585 filed Nov. 23, 2020, which claims the benefit of Korean Patent Application No. 10-2019-0152004, filed on Nov. 25, 2019, in the Korean Intellectual Property Office, the disclosures of which are incorporated herein in their entirety by reference.

TECHNICAL FIELD

The present invention relates to a graft copolymer, the graft copolymer of the present invention having smaller inter-particle aggregation than dry powder-type graft copolymers and thus having merits in that the graft copolymer is easily transported and has a low temporal change in product quality during long-term storage due to.

BACKGROUND ART

Graft copolymers, for example, ABS-based copolymers such as acrylonitrile-butadiene-styrene, etc. or ASA-based copolymers such as acrylate-styrene-acrylonitrile, etc. have relatively satisfactory physical properties such as formability and glossiness as well as stiffness, chemical resistance and shock resistance, and are thus widely used as housings or interior/exterior materials for various products such as electrical components, electronic components, office instruments or automobile components.

In general, graft copolymers are prepared as resin compositions in order to improve shock resistance by graft-copolymerizing styrene and acrylonitrile copolymerized to a rubber latex such as polybutadiene or poly(butylacrylate) through an emulsion polymerization method, and then, kneading the resultant with a SAN-based resin such as styrene-acrylonitrile copolymer or a thermoplastic resin such as polystyrene or polymethylmethacrylate. In this preparation process, graft copolymers are generally prepared in the form of dry powder (DP) before being kneaded with a thermoplastic resin, and the graft copolymers in the form of dry powder may be kneaded with thermoplastic resin immediately after being prepared, but may also be kneaded with thermoplastic resins through a separate kneading process after a predetermined time elapses from the time of preparation. Accordingly, ease of storage of graft copolymers themselves and the temporal change characteristics of the quality of long-term stored graft copolymers are main factors that should be considered in preparing graft copolymers.

Meanwhile, graft copolymers in the form of dry powder have merits of easy preparation processes, but when not immediately kneaded with a thermoplastic resin, the graft copolymers in the form of dry powder may cause a caking phenomenon in which powder particles are aggregated with each other during long-term storage and are not easily separated from each other. Thus, research is being demanded which can improve the ease of storage and minimize a temporal change in quality for prepared graft copolymers.

PRIOR ART DOCUMENT

Patent Document (Patent Document 1) KR 10-2019-0059037 A

DISCLOSURE OF THE INVENTION

Technical Problem

An aspect of the present invention provides a graft copolymer, the temporal quality change of which is minimized even in long-term storage, and in which inter-particle aggregation is small during storage.

Technical Solution

According to an aspect of the present invention, there is provided a graft copolymer which includes one or more among a conjugate diene-based monomer-derived unit and an acrylate-based monomer derived-unit and one or more among a vinylcyan-based monomer derived unit and an aromatic vinyl-based monomer derived unit, and which has a bulk density of 450 kg/m$^3$ to 700 kg/m$^3$.

According to another aspect of the present invention, there is provided a pellet formed of a graft copolymer.

According to another aspect of the present invention, there is provided a method for preparing a copolymer, the method including: (S1) polymerizing a conjugate diene-based polymer or an acrylate-based polymer with one or more among a vinylcyan-based monomer and an aromatic vinyl-based monomer to obtain a reaction product including a graft copolymer; and (S2) forming the reaction product in the form of a pellet through an extruder.

Advantageous Effects

A graft copolymer provided by the present invention has excellent ease of storage, small inter-particle aggregation even in long-term storage, minimized temporal change in quality, and a low amount of residual monomers, and thus, the graft copolymer may later be applied to a thermoplastic resin composition or the like and the physical properties of a product may be excellently maintained.

MODE FOR CARRYING OUT THE INVENTION

Figure 1:
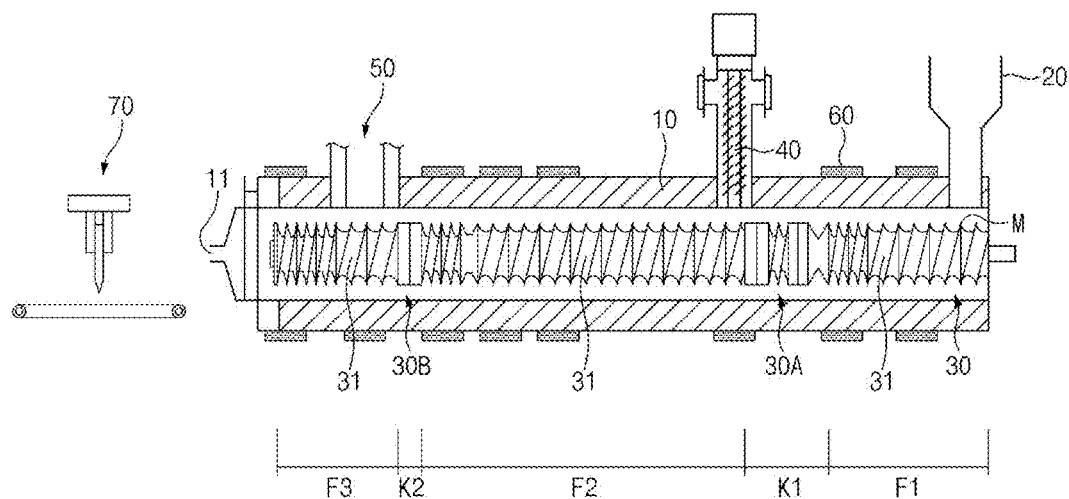
FIG. 1 illustrates an extruder equipped with a ventilation part usable in preparation of a graft copolymer of the present invention.

Hereinafter, the present invention will be described in more detail.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Graft Copolymer

An acrylonitrile-butadiene-styrene copolymer or a graft copolymer such as acrylate-styrene-acrylonitrile, which are widely used in various industrial fields, are prepared by mixing vinylcyan-based monomers and aromatic vinyl-based monomers, which constitute shells, with a rubber polymer serving as cores of particles, and then being subjected to a graft polymerization reaction.

Although the polymerization reaction in such a preparation process may be performed through various methods, such as, emulsion polymerization, solution polymerization or bulk polymerization, the emulsion polymerization is preferred in terms of achieving a uniform reaction, easy adjustment of molecular weight, and high polymerization speed.

Meanwhile, when graft copolymers are prepared through an emulsion polymerization method, the reaction product obtained by completing a reaction includes, aside from finally polymerized graft copolymers, a dispersion medium such as water, an emulsifier, a surfactant and the like which should be added for emulsion polymerization, and the graft copolymers are present in a form dispersed inside the reaction product. Accordingly, in order to use the completely polymerized graft copolymers later as products, it is necessary to remove a dispersion medium and impurities and agglomerate the dispersed graft copolymers, and thus, processes of aggregation, dispersion medium removing (dehydration), and drying are performed in the graft copolymer preparation process after the polymerization.

When undergone such the processes of aggregation, dispersion medium removing, and drying, the dispersion medium is mostly removed, and the graft copolymer is dried in an aggregated state, and thus, the final product is prepared in the form of dry powder. The graft copolymer in the form of dry powder may directly be made into a product later according to need, or be mixed with another thermoplastic resin and used as a thermoplastic resin composition.

However, when the graft copolymers have the form of dry powder described above, a phenomenon of inter-powder particle aggregation may occur in a storage or transportation process before being used later. In particular, when a great amount of dry powder is stored or transported, the powder located at a lower portion may form a lump such as a cake due to the pressure of the powder located at an upper portion, and this caking phenomenon causes problems of not only making it difficult to use dry powder later, but also degrading the quality of dry powder particles.

In order to solve such problems, the inventors of the present invention did not completely dehydrate the reaction products prepared through an existing emulsion polymerization method, but adjusted the percentage of water content in a specific range and then prepared the reaction products in the form of a pellet through an extruder, thereby inventing a graft copolymer that may solve conventional problems caused due to the form of dry powder.

Specifically, the present invention provides a graft copolymer having a bulk density of 450 kg/m$^3$ to 700 kg/m$^3$. For example, a graft copolymer provided by the present invention has a bulk density of no less than 450 kg/m$^3$, 500 kg/m$^3$, 530 kg/m$^3$, or 550 kg/m$^3$ and no greater than 700 kg/m$^3$, 650 kg/m$^3$, 600 kg/m$^3$, or 570 kg/m$^3$, whereas a conventional graft copolymer prepared in the form of dry powder has a bulk density of less than 450 kg/m$^3$ or less than 400 kg/m$^3$. A graft copolymer of the present invention is characterized in that since a large amount of graft copolymers are physically coupled to each other, the graft copolymer of the present invention exhibits a larger bulk density than those in the form of dry powder.

In the present invention, a graft copolymer specifically includes one or more among a conjugate diene-based monomer-derived unit and an acrylate-based monomer-derived unit, and one or more among a vinylcyan-based monomer-derived unit and an aromatic vinyl-based monomer-derived unit.

More specifically, the graft copolymer may include a conjugate diene-based monomer-derived unit, a vinylcyan-based monomer-derived unit, and an aromatic vinyl-based monomer-derived unit, or may include an acrylate-based monomer-derived unit, a vinylcyan-based monomer-derived unit, and an aromatic vinyl-based monomer-derived unit.

In particular, when the graft copolymer specifically includes a conjugate diene-based monomer-derived unit, a vinylcyan-based monomer-derived unit, or an aromatic vinyl-based monomer-derived unit, the graft copolymer may be obtained by graft polymerization of vinylcyan-based monomers and aromatic vinyl-based monomers to conjugate diene-based monomers. In addition, when the graft copolymer includes an acrylate-based monomer-derived unit, a vinylcyan-based monomer-derived unit, or an aromatic vinyl-based monomer-derived unit, the graft copolymer may be obtained by graft polymerization of vinylcyan-based monomers and aromatic vinyl-based monomers to acrylate-based monomers.

The conjugate diene-based monomers may be produced and used by directly emulsifying and polymerizing the conjugate diene-based monomers, or used by purchasing commercially available conjugate diene-based polymer products, and various forms such as latex, powder, or the like may be used as the conjugate diene-based polymer. Specific types of the conjugate diene-based monomers include 1,3-butadiene, isoprene, chloroprene, piperylene, or the like, and among these, the 1,3-butadiene is used more frequently.

The acrylate-based monomers may be produced and used by directly emulsifying and polymerizing the acrylate-based monomers, Or used by purchasing commercially available acrylate-based polymer products, and various forms such as latex, powder, or the like may be used as the acrylate-based polymer.

Specific types of the acrylate-based monomers include acylate, methyl acrylate, ethyl acrylate, butyl acrylate, and the like, and among these, the butyl acrylate is used more frequently.

Specific types of the aromatic vinyl-based monomers include styrene, α-methyl styrene, α-ethyl styrene, p-methyl styrene, and the like, and among these, styrene is used more frequently. Specific types of vinylcyan-based monomers include acrylonitrile, methacrylonitrile, ethacrylonitrile, phenylacrylonitrile, α-chloroacrylonitirle, and the like, and among these, acrylonitrile is used more frequently.

Meanwhile, the "derived unit" in the present invention may mean a repeat unit derived from a compound which participates in a polymerization reaction as a monomer in a polymer or a copolymer and is included in the polymer or the copolymer.

The whiteness index (W.I) of a graft copolymer according to the present invention may be 15 or more and more preferably 20 or more. When preparing a graft copolymer through a method to be described for preparing a graft copolymer of the present invention, the graft copolymer is immediately pelltized in a state of a reaction product, and a graft copolymer having excellent whiteness index may be prepared. Conversely, in order to improve inferior ease of storage of existing dry powder, re-pelletizing the dry powder through an extruder and storing the resultant may be considered, but when the already prepared dry powder is re-pelletized, soot may occur on the surface of dry powder due to the heat and pressure applied in a pelletizing process, and thus, the final whiteness index may be lower than that of the graft copolymer of the present invention. When the copolymer exhibits a high whiteness index, the copolymer has a merit of being easily applicable later to a field that requires various colors.

The present invention provides a pellet formed of a graft copolymer as described above. The pellet of the present invention may have a shape, such as a sphere, a circular cylinder, or a polygonal cylinder, and may also have an irregular shape that is difficult to be specified as a certain shape. Those skilled in the art may appropriately adjust and use the shape of the pellet according to an aimed target.

In the pellet of the present invention, the long diameter of the pellet may be 1-5 mm and desirably 2-4 mm, and the short diameter may be 1-5 mm and desirably 2-4 mm. The long diameter and the short diameter are respectively defined as the lengths of the longest axis and the shortest axis which pass though the center of the pellet. When the long diameter and the short diameter of the pellet satisfy the above-described ranges, the pellet has an appropriate size, is easily prepared and stored while minimizing the problem occurred in existing dry powder, and is appropriately used later according to required conditions of various industrial fields.

Method for Preparing Graft Copolymer

The present invention also provides a method for preparing the graft copolymer described above, and specifically, the preparation method may include: (S1) graft polymerizing one or more among a vinylcyan-based monomer and an aromatic vinyl-based monomer to a conjugate diene-based polymer or an acrylate-based polymer to obtain a reaction product including a graft copolymer; and (S2) forming the reaction product in the form of a pellet through an extruder.

The step S1 is a step for preparing a graft copolymer through emulsion polymerization as described above. As well known in the present technical field, the emulsion polymerization in this step may be performed in the presence of an emulsifier, a polymerization initiator, an activator, a molecular weight adjuster, or the like.

For example, the emulsifier may be one or more selected from the group consisting of sodium dicyclohexyl sulfosuccinate, sodium dihexyl sulfosuccinate, sodium di-2-ethylhexyl sulfosuccinate, potassium di-2-ethylhexyl sulfosuccinate, sodium dioctyl sulfosuccinate, sodium dodecyl sulfate, sodium dodecyl benzene sulfate, sodium octadecyl sulfate, sodium oleic sulfate, sodium dodecyl sulfate, potassium octadecyl sulfate, potassium rosinate, and sodium rosinate, and among these, sodium dodecyl benzene sulfate is desirable.

The emulsifier may be added, based on 100 parts by weight of the monomers and the polymers which serve as targets of polymerization, in an amount of 0.1-2 parts by weight or 0.3-0.7 parts by weight, and among these, it is desirable to add the emulsifier in an amount of 0.3-0.7 parts by weight. When the above-described range is satisfied, the polymerization reaction may be stably performed and thus, the formation of solidified object may be suppressed.

The type of the polymerization initiator may be one or more selected from the group consisting of sodium persulfate, potassium persulfate, ammonium persulfate, potassium super phosphate, hydrogen peroxide, t-butyl peroxide, cumene hydroperoxide, p-mentane hydroperoxide, di-t-butyl peroxide, t-butylcumyl peroxide, acetyl peroxide, isobutyl peroxide, octanoyl peroxide, dibenzoyl peroxide, 3,5,5-trimethylhexanol peroxide, t-butyl peroxy isobutalate, axobis isobutyronitrile, azobis-2,4-dimetylvaleronitrile, azobis cyclohexanecarbonitrile and azobis isobutyric acid (butyric acid) methyl ester, and among these, t-butyl hydroperoxide is desirable. The initiator may be added, based on 100 parts by weight of the monomers and the polymers which serve as targets of polymerization, in an amount of 0.01-1 parts by weight or 0.05-0.5 parts by weight, and among these, it is desirable to add the initiator in an amount of 0.05-0.5 parts by weight. When the above-described range is satisfied, a polymerization reaction is uniformly performed and the shock resistance of a polymer may be more excellent.

The activator is one or more selected from the group consisting or sodium formaldehyde sulfoxylate, disodium ethylenediamine tetraacetate, ferrous sulfate, dextrose, sodium pyrophosphate, sodium pyrophosphate anhydrous, and sodium sulfate, and among these, one or more selected from the group consisting of dextrose, ferrous sulfate, and sodium pyrophosphate is desirable. The activator may be added, based on 100 parts by weight of the monomers and the polymers which serve as targets of polymerization, in an amount of 0.01-1 parts by weight or 0.1-0.5 parts by weight, and among these, it is desirable to add the activator in an amount of 0.1-0.5 parts by weight. When the above-described range is satisfied, the flow index, shock resistance, and color characteristics of the prepared polymer may be excellent.

The molecular weight adjuster may be one or more selected from the group consisting of α-methylstyrene dimer, t-dodecyl mercaptan, n-dodecyl mercaptan, n-octyl mercaptan, carbon tetrachloride, methylene chloride, methylene bromide, tetraethyl thiuram disulfide, dipentamethylene thiuram disulfide, and diisopropylxanthogen disulfide, and among these, t-dodecyl mercaptan is desirable. The molecular weight adjuster may be added, based on 100 parts by weight of the monomers and the polymers which serve as targets of polymerization, in an amount of 0.01-1.5 parts by weight or 0.1-1 parts by weight, and among these, it is desirable to add the molecular weight adjuster in an amount of 0.1-1 parts by weight. When the above-described range is satisfied, the balance between the flow index, shock resistance, and color characteristics of the prepared polymer may be excellent.

In addition, water may be used as the dispersion medium in this step.

The reaction product including the graft copolymer prepared through above-described step S1 has the form of an emulsion in which the graft polymer is dispersed in water. Thus, in order to selectively make only the graft copolymer in the emulsion as a product, the dispersion medium in the reaction product is required to be removed, and the reaction product obtained through step S1 of the present invention is subsequently added to an extruder through step S2 and the dispersion medium inside the reaction product is removed and the reaction product is formed in the form of a pellet. As described above, the pellet may have a bulk density of 450-700 kg/m$^3$.

Accordingly, the extruder used in the present invention should be capable of maximally remove the dispersion medium remaining in the reaction product while suppressing a reverse flow of the dispersion medium removed in the extrusion process, and capable of forming, for example, a sealing region for preventing a reverse flow of the dispersion medium inside the extruder. The sealing region means a region in which the reaction product does not substantially move in the region and fully fills the inside of the extruder because the amount of the reaction product added in the sealing region and the amount of the reaction product exiting from the sealing region are the same, and thus, the movement of a gas or a liquid before and after the region may be prevented, and specifically, the sealing region may be formed by means of various internal configurations of the extruder, and for example, may be formed by a ring structure, a combination of a reverse direction screw and a neutral direction screw, or the like inside the extruder. Due to such the sealing region, a reverse flow of the dispersion medium removed from the reaction product in the extrusion process may be suppressed.

Meanwhile, since the reaction product prepared through step S1 includes a great amount of dispersion medium, subsequent pelletization may be easier when the reaction product is added to the extruder after removing a portion of the dispersion medium. Accordingly, the method for preparing a graft copolymer according to the present invention is characterized by further including, before step S2 above, (S-1) adjusting the percentage of water content in the reaction product to be less than 30%, wherein the extruder is provided with one or more ventilation parts, or by further including, before step S2 above, (S1-2) adjusting the percentage of water content to be 30-60%, wherein the extruder is provided with two or more side slots.

When the adjusting the percentage of water content to be less than 30% (S1-1) is included, since the amount of the dispersion medium remaining inside the reaction product added to the extruder is small, the dispersion medium is mostly vaporized by the heat applied in the extrusion process, and is thus removed in a gas state. Accordingly, in this case, the extruder desirably has one or more ventilation parts in order to smoothly remove a great amount of gas. For the ventilation part, configurations, which are used as passages through which vaporized materials may pass in conventional extruders, such as a side ventilation stuffer, a side feeder, or an open barrel, may be applied.

More specifically, the extruder provided with the ventilation part may have the shape of FIG. 1. The extruder is characterized by including a barrel 10, a screw 30 mounted inside the barrel 10, a ventilation part 40 for discharging steam inside the barrel 10 to the outside, and a heater part 60 for heating the barrel 10. In addition, a sealing region is formed by a melted raw material (reaction product) inside the barrel 10.

The barrel 10 has a hollow pipe shape in the lengthwise direction thereof, and a hopper 20 for adding a raw material is coupled to one side of the barrel, and a discharge port 11 for discharging a dehydrated raw material, that is, a graft copolymer of the present invention, is formed on the other side of the barrel.

The barrel 10 is desirably manufactured by using a metal having excellent chemical resistance in order to prevent corrosion due to a volatile material and steam which are discharged from the raw material, or manufactured by coating an inner surface the barrel with a protective material or the like, and manufactured to have sufficient stiffness so as to endure the heat and pressure that are generated inside the barrel.

The screw 30 has a rod shape and a structure in which threads (M) 31 are formed on the outer circumferential surface thereof. In addition, the screw is attached to the inside the barrel 10 and moves the raw material added from the hopper 20 while rotating about an axis in one direction.

At this point, in the screw 30, the threads (M) are formed in a streamline shape in the lengthwise direction on the outer circumferential surface of the screw, in which a portion in which the threads M are formed in the direction in which the raw material is moved toward an addition port is divided into forward zones (F1, F2 and F3 sections), and a portion in which the threads are formed so that a movement of the raw material is stopped and only the rotation is performed, or so that a reverse direction movement (that is, movement from the discharge port of the barrel toward the hopper) is performed is defined as a kneading zone 30A.

Meanwhile, in the present invention, the screw 30 may have sections (F1, F2 and F3) in which a plurality of forward zones are formed and sections (K1 and K2) in which a plurality of kneading zones are formed.

In the first forward zone, forward direction threads 31 are formed so that the raw material added from the hopper 20 during axial rotation moves toward the discharge port 11, and in the kneading zone 30A, neutral-type threads 32 or reverse direction threads 33 are formed so that the moved raw material is compressed in the first forward zone during the axial rotation of the screw 30. In addition, also in a sub kneading zone 30B, as in the same manner in the kneading zone 30A, neutral threads 32 or reverse direction threads 33 are formed, and in the second forward zone and the third forward zone, forward direction threads are formed as in the first forward zone.

In addition, the ventilation part 40 is mounted to the barrel 10 so that steam (and separated gas, etc.) is discharged after the raw material passes through the kneading zone 30A from the hopper 20. The ventilation part 40 may be formed in a shape of a simple pipe open toward an upper side of the barrel 10, but may also be provided such that an openable/closable valve, a discharge device for forcibly discharging steam, and a safety valve which opens only under a predetermined pressure or higher are coupled to the ventilation part.

In addition, the heater part 60 for generating heat is coupled to the outer surface (or inside) of the barrel 10. The heater part 60 may be a device that converts electrical energy into thermal energy, or also be a device that receives a heat source from the outside and heats the barrel.

A plurality of heater parts 60 are attached over the entirety of the barrel, and the heater parts 60 are each configured so that the temperature thereof can be adjusted individually. Accordingly, the barrel 10 is implemented so that individual adjustment for each section (forwarding zones and kneading zones) can be performed.

In the extruder of the present invention having the above-described configuration, when a raw material stored in the hopper 20 is supplied into the barrel 10, the raw material is fed inside the barrel 10 through the screw 30, and is heated (or cooled) up to a target temperature by the heater part 60.

At this point, when a raw material passes the first forward zone and reaches the kneading zone 30A, the raw material receives a pressure due to trailing raw materials continuously supplied in a heated state and the rotational force of the screw 30.

Accordingly, the heated and pressurized raw material is melted in the kneading zone 30A (or before reaching the kneading zone), and at least a portion or most of the raw material is subjected to a phase change into a liquid state.

That is, while a phase change from a solid state to a high viscosity liquid state is performed in the raw material heated and pressurized in the kneading zone 30A, force acts so that the raw material radially spreads due to centrifugal force generated in the kneading zone 30A.

Accordingly, in the front side (side close to the hopper) of the kneading zone 30A, the solid state raw material, steam separated from the raw material, and the like spread in a space between the screw 30 and the barrel 10, and as heat and pressure are continuously applied, most of the solid state raw material is melted into a liquid state in the rear side (side close to the discharge port) of the kneading zone 30A. At this point, the melted raw material forms a sealing region that shields a cross-section of the barrel 10 by centrifugal force.

At this point, the thickness and the position at which the sealing region is formed may vary according to the rotation speed of the screw 30, the heating temperature of the heater part 60, and the configuration of the threads formed inside the kneading zone 30A, but the sealing region is formed not in a fixed state but in a fluidic state inside the barrel 10.

That is, the sealing region is formed in a liquid state film, and as the raw material is continuously supplied, the raw material that firstly forms the sealing region passes the kneading zone 30A and is discharged to the second forward zone, and the raw material subsequently supplied is turned into a liquid state and supplements the firstly discharged raw material and maintains the sealing region.

According to the state and amount of the raw material added so that the sealing region may be continuously maintained, the heating temperature and the speed of axial rotation of the screw are controlled.

The liquid state raw material and gas state steam which pass the kneading zone are fed to the region of the second forward zone, and at this point, the liquid state raw material is continuously fed along the screw 30, whereas the gas state steam (and gas or the like generated during phase change) is discharge through the ventilation part 40 to the outside. At this point, a reverse flow of the steam toward the hopper 20 is prevented by the sealing region formed in the kneading zone 30A.

In addition, the raw material reaching the sub kneading zone 30B forms a sealing zone again in the sub kneading zone 30B, and is discharged to the discharge port 11 through the third forward zone. While the raw material is fed through the third forward zone, impurities (residual monomers or the like) contained in the raw material, gas, residual steam generated during phase change, and the like are discharged to the outside through the sub ventilation part 50.

At this point, the raw material discharged to the discharge port 11 of the barrel 10 is discharged in the form of a solid lump by separating steam, gas and the like and performing cooling.

The raw material discharged in the form of a solid lump is cut in the form of a pellet having a certain size by a crushing device 70 that crushes the dehydrated (dried) raw material.

Meanwhile, in the extruder of the present invention, it is desirable to limit the distances between respective components so as to enhance the drying and dehydrating performance. With respect to the diameter D of the barrel 10, the distance from the hopper 20 to the kneading zone 30A is desirably determined to be 5D to 10D, the distance between the kneading zone 30a and the ventilation part 40 is desirably determined to be 3D or more, and the distance between the sub kneading zone 30B and the sub ventilation part 50 is desirably determined to be 3D or less. However, such the relative distances are not limited to the above ranges, and may vary according to the length of the screw 30, the speed of the axial rotation, the state of the raw material, the output of the heater part 60, and the like.

In the extruder according to the present invention having the above-described configuration, the sealing region is formed in the kneading zone 30A while dehydration of a raw material is in progress, so that there is an effect in that reverse flow of stem toward the hopper 20 may be pretended or minimized.

Since the kneading zone 30A may include either a neutral zone or a reverse zone, or a combination of the both, the configuration of the kneading zone 30A may be selected according to the state and property of the raw material.

In addition, since the screw 30 may further include the sub kneading zone 30B in the present invention, the sealing region can be further formed, and steam can be maximally discharged from the ventilation part 40 while more efficiently preventing a reverse flow of the steam.

In addition, in the extruder according to the present invention, since moisture contained in the raw material is discharged to the ventilation part 40 simultaneously with extrusion, it may be possible to maximally discharge impurities (residual monomers and the like) contained in the raw material from the sub ventilation part 50.

When the adjusting (S1-2) of the percentage of water content in the reaction product to be 30-60% is included, the amount of the remaining dispersion medium in the reaction product is relatively large, and therefore the dispersion medium is removed not in a gas state but in a liquid state in the extrusion process, and thus, the extruder is desirably provided with a side slot in order to smoothly remove the liquid-state dispersion medium. In addition, when the percentage of water content is high, the amount of dispersion medium is large and thus, it is desirable that the number of side slots be two or more. Meanwhile, the adjusting (S1-2) of the percentage of water content to be 30-60% may be a step for adjusting the percentage of water content to be specifically 30-50%, and more specifically to be 30-40%, and the number of the side slots may be 2 to 10, preferably 2 to 5.

Figure 2:
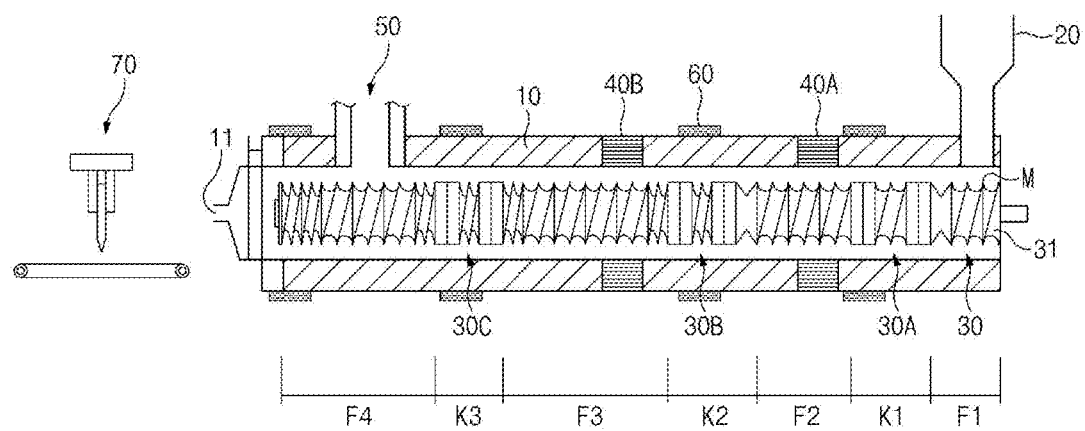
FIG. 2 illustrates an extruder equipped with a side slot usable in preparation of a graft copolymer of the present invention.

Meanwhile, as illustrated in FIG. 2, the specific shape of the extruder including the side slots may include slot parts 40A and 40B instead of the ventilation part in the configuration of the extruder including the above-described ventilation part.

In the slot parts 40A and 40B, a plurality of slots are formed with gaps therebetween. The slots are each formed in a long-hole shape, and are desirably disposed to be parallel to the lengthwise direction of the barrel 10.

At this point, the slots may be formed along the periphery of the barrel 10 with a certain gap therebetween. That is, when the barrel 10 is of a cylindrical pipe type, the slot part 40A may be formed so that slots constitute a ring-like disposition structure along the entire periphery of the barrel 10. However, the slots may be formed in only a specific portion of the barrel 10 so that the discharge direction of steam may be controlled inside the barrel 10.

That is, when the slots are formed also in a lower portion of the barrel 10, not only moisture but also a portion of the raw material may be discharged, and thus, the slots may not be formed in the lower surface of the barrel 10. In addition, owing to such reasons, a slot in a specific region may have a greater width or area than other slots. For example, the slot formed in the lower surface of the barrel 10 may be formed to be narrow and small in order to prevent drop of the raw material, and the slot formed in an upper surface of the barrel may be formed to be wider and larger in order to facilitate the discharge of steam.

In addition, the slot parts 40A and 40B may also be provided simply in a shape in which holes are formed, but an openable/closable valve, a discharge device for forcibly discharging steam, and a safety vent that is opened only under a certain pressure or higher may be further coupled thereto.

In addition, in the extruder including the slot parts, the distance from the hopper 20 to the kneading zone 30A is desirably determined to be 5D to 10D with respect to the diameter D of the barrel 10. In addition, the distance between the kneading zone 30A and the slot part 40A is desirably determined to be 3D or less, the distance between the slot part 40A and the first sub kneading zone 30B is desirably determined to be 3D or more, and the distance between the first sub kneading zone 30B and the sub slot part 40B and the distance between the sub ventilation part 50 and the second sub kneading zone 30C are desirably determined to be 3D or less.

However, such the relative distances are not limited to the above ranges, and may vary according to the length of the screw 30, the speed of the axial rotation, the state of the raw material, the output of the heater part 60, and the like.

In the extruder illustrated in FIG. 2, remaining configurations excluding the slot parts may be described in the same manner described above in the extruder illustrated in FIG. 1.

The adjustment of the percentage of water content in steps S1-1 and S1-2 may be performed through the same method as conventional dehydration and drying processes, and those skilled in the art may select and apply specific method and device for dehydration and drying according to a target range of the percentage of water content. In addition, the "percentage of water content" in the present invention is not limited to a case in which the dispersion medium is water, and also in the case in which a liquid other than water is used as a dispersion medium, the content of the dispersion medium remaining in a reaction product may be referred as "the percentage of water content".

Thermoplastic Resin Composition

The present invention provides a thermoplastic resin composition including the above-described graft copolymer and a thermoplastic resin.

A graft copolymer according to the present invention may be provided as a thermoplastic resin composition by being mixed with various thermoplastic resins like conventional copolymer dry powder.

The thermoplastic resins that can be mixed with the graft copolymer according to the present invention may include a polystyrene resin such as a styrene-acrylonitrile (SAN) resin, a poly(meth)acrylate-based resin, a polycarbonate resin, and the like.

The thermoplastic resin composition provided by the present invention exhibits an excellent whiteness index while exhibiting satisfactory physical properties, and may thus widely applied to the fields requiring various colors.

Hereinafter, preferable examples are provided to help understanding the present invention. However, the examples below merely exemplify the present invention and are not construed to limit the scope of the present invention.

Example 1

A reaction product was prepared by adding, to ion exchange water serving as a dispersion medium, 60 parts by weight of a polybutadiene polymer, 30 parts by weight of a styrene monomer, and 10 parts by weight of an acrylonitrile monomer, and performing an emulsion reaction on the mixture. The reaction product was prepared in pellets by dehydrating the reaction product and adjusting the percentage of water content to be 18%, and then feeding the resultant into an extruder equipped with the ventilation part of FIG. 1. The long diameter of the prepared pellets was 3 mm and the short diameter was 1.5 mm.

Example 2

The reaction product prepared in Example 1 was dehydrated to adjust the percentage of water content to be 33%, and was then fed to the extruder equipped with the slot part of FIG. 2, thereby preparing pellets. The long diameter of the prepared pellets was 3 mm and the short diameter was 1.5 mm.

Comparative Example 1

The reaction product prepared in Example 1 above was prepared in the form of dry powder via processes of aggregation, cleaning, dehydration and drying.

Comparative Example 2

A reaction product was prepared by adding, to ion exchange water serving as a dispersion medium, 50 parts by weight of a polybutylacrylate polymer, 40 parts by weight of a styrene monomer, and 10 parts by weight of an acrylonitrile monomer, and performing an emulsion reaction on the mixture. The prepared reaction product was prepared in the form of dry powder via processes of aggregation, cleaning, dehydration and drying.

Experimental Example 1. Confirmation of Bulk Density of Prepared Copolymer

The bulk densities of copolymers prepared in Examples and Comparative Examples above were measured. Specifically, the prepared copolymers are fully filled in containers having certain volumes, the weights thereof were then measured, and the bulk densities were measured by dividing the measured weight by the volume of each of the containers. The measurement results are shown in the table 1 below.

TABLE 1

| | Example 1 | Example 2 | Comparative Example 1 | Comparative Example 2 |
|---|---|---|---|---|
| Bulk density $(kg/m^3)$ | 560 | 560 | 395 | 395 |

From the results of table above, it was confirmed that the copolymers according to the present invention had a high bulk density than the copolymers in the form of dry powder prepared through an existing method.

Experimental Example 2. Confirming Whether Caking Occurred

Whether a caking phenomenon occurred in the copolymers prepared in Example 2 and Comparative Example 1 was confirmed. Specifically, the prepared copolymers each are fully filled in a cylindrical mold (diameter 60 mm) to which a lubrication oil was applied, aggregation of particles was then generated by raising a specific value load and applying a pressure, and then the mold was removed and the shape of the resultant was confirmed, thereby confirming how many aggregation of particles occurred and the degree that the aggregation phenomenon was not solved even after a certain time elapsed. The applied load and the results according to elapsed time are illustrated in FIG. 3.

Figure 3:
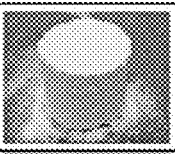
FIG. 3 arranges and illustrates a caking occurrence test result for pellets prepared in Examples of the present invention and dry powder prepared in a Comparative Example.
Figure 3:
Figure 3:
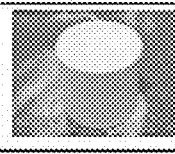
Figure 3:
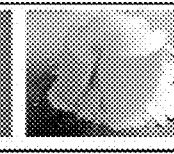
Figure 3:
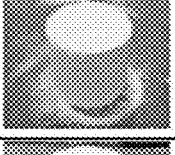
Figure 3:
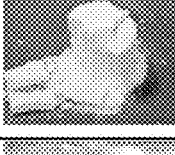
Figure 3:
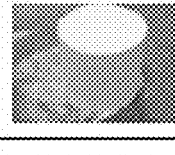
Figure 3:
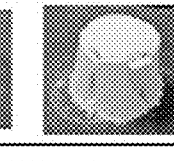
Figure 3:
Figure 3:
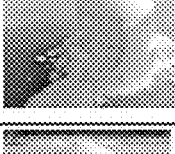
Figure 3:
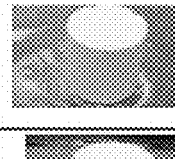
Figure 3:
Figure 3:
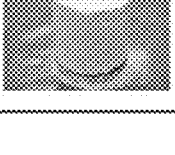
Figure 3:
Figure 3:
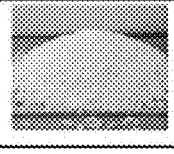
Figure 3:
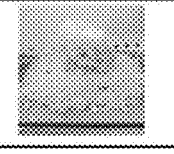

As illustrated in FIG. 3, it was confirmed that in case of the copolymer prepared in the form of dry powder, an aggregation phenomenon occurred directly after application of a load, and a certain degree of the aggregation phenomenon was not solved even after a maximum of 15 days elapsed, whereas in the copolymer prepared in the form of a pellet in Example 2 (DPE), an aggregation phenomenon does not occur at all, and even when a relatively high load was applied, the aggregation phenomenon was easily solved compared to the dry powder.

Experimental Example 3. Measurement of Yield Strength

Caking phenomena were generated in the same way as that in Example 2 above on the graft copolymers prepared in Example 2, Comparative Example 1 and Comparative Example 2, and then unconfined yield strength (UYS), which was the force when the formed cake shape is destroyed, was measured. The conditions for causing a caking phenomenon were set as 80° C., a pressure of 4.5 kg (15.7 kPa), and elapsed time of 8 days, and measurement was repeated four times in order to confirm reproducibility and an average value was obtained. Zwick was used as the device for measuring UYS. The measurement results are shown in the table 2 below.

TABLE 2

|  | Example 2 | Comparative Example 1 | Comparative Example 2 |
|---|---|---|---|
| UYS (kPa) | Immeasurable | 63.1 | 106.8 |

As can be confirmed from the above results, a certain degree of force was required until the cake shape was destroyed in Comparative Examples 1 and 2 having the forms of dry powder, but in case of Example 2 having the form of a pellet, the yield strength could not be measured because a caking phenomenon itself did not easily occur. That is, it was confirmed that a caking phenomenon almost did not occur in the graft copolymer according to the present invention, and a cake could be so easily destroyed that the yield strength could not be measured even if a caking phenomenon occurred, and thus, the graft copolymer was not strongly aggregated during storage. Conversely, the existing dry powder was strongly aggregated with each other when a caking phenomenon occurred during storage, and thus was not easily decomposed.

Experimental Example 4. Confirmation of Whiteness Index and Yellowness Index

The copolymer prepared in Comparative Example 1 was fed into the extruder again and was prepared in a pellet shape, and the whiteness indexes (W.I) and yellowness indexes (Y.I) of the copolymer prepared in a pellet shape in Example 2 and the copolymer prepared in a pellet shape in Comparative Example were confirmed through a colorimeter. The results thereof are shown in Table 3 below.

TABLE 3

|  | L* | a* | b* | W.I | Y.I |
|---|---|---|---|---|---|
| Example 2 | 83.02 | −2.17 | 7.20 | 32.34 | 12.00 |
| Comparative Example 1 | 69.32 | −1.39 | 25.67 | −29.71 | 43.67 |

In the indexes of Table 3 above, a high whiteness index means that the color of the prepared graft copolymer is close to white, and a high yellowness index means that the color of the prepared copolymer is close to yellow. As can be confirmed from the results of Table 3, it was confirmed that the copolymer prepared directly in a pellet shape in the example of the present invention exhibits higher whiteness index and lower yellowness index than the copolymer prepared in a pellet shape from dry powder in the Comparative example, and may accurately implement a target color even when used together with various pigments or the like, and thus, may be widely used in industrial fields requiring various colors.

DESCRIPTION OF SYMBOLS

10: Barrel
11: Discharge port
20: Hopper
30: Screw
30A to 30C: Kneading zone
31: Thread
40: Ventilation part
40A: Slot part
40B: Sub slot part
50: Sub ventilation part
60: Heater part
70: Crushing device

The invention claimed is:

1. A method for preparing a graft copolymer pellet formed of a graft copolymer, the method comprising:
(S1) polymerizing a conjugate diene-based polymer or an acrylate-based polymer with one or more among a vinylcyan-based monomer and an aromatic vinyl-based monomer to obtain a reaction product including a graft copolymer; and
(S2) forming the reaction product in the form of a pellet through an extruder,
wherein the reaction product comprises a dispersion medium including water, and
wherein the extruder includes a barrel, a screw mounted inside the barrel, a ventilation part for discharging steam, and a heater part for heating the barrel,
a hopper is coupled to one side of the barrel, and a discharge port for discharging the reaction product is on another side of the barrel,
the screw has a plurality of forward zones alternating with a plurality of kneading zones, and
the forward zones have forward direction threads, and the kneading zones have neutral-type threads or reverse direction threads.

2. The method of claim 1, wherein the pellet has a bulk density of 450 kg/m$^3$ to 700 kg/m$^3$.

3. The method of claim 1, comprising (S-1) adjusting a percentage of water content to be less than 30% before step S2, wherein the extruder comprises a side ventilation part.

4. The method of claim 1, comprising (S1-2) adjusting a percentage of water content to be 30% to 60% before step S2, wherein the extruder comprises two or more side slots.

* * * * *